(No Model.)

P. S. BASNETT.
GATE.

No. 328,748. Patented Oct. 20, 1885.

WITNESSES
Phil C Dieterich.
Arthur L Morsell

INVENTOR
P. S. Basnett,
By Louis Bagger & Co.
Attorneys.

UNITED STATES PATENT OFFICE.

PHILIP SHIVELY BASNETT, OF BASNETTVILLE, WEST VIRGINIA.

GATE.

SPECIFICATION forming part of Letters Patent No. 328,748, dated October 20, 1885.

Application filed May 5, 1885. Serial No. 164,477. (No model.)

*To all whom it may concern:*

Be it known that I, PHILIP S. BASNETT, a citizen of the United States, and a resident of Basnettville, in the county of Marion and State of West Virginia, have invented certain new and useful Improvements in Gates; and I do hereby declare that the following is a full, clear, and exact description of the invention, which will enable others skilled in the art to which it appertains to make and use the same, reference being had to the accompanying drawings, which from a part of this specification, and in which—

Figure 1:
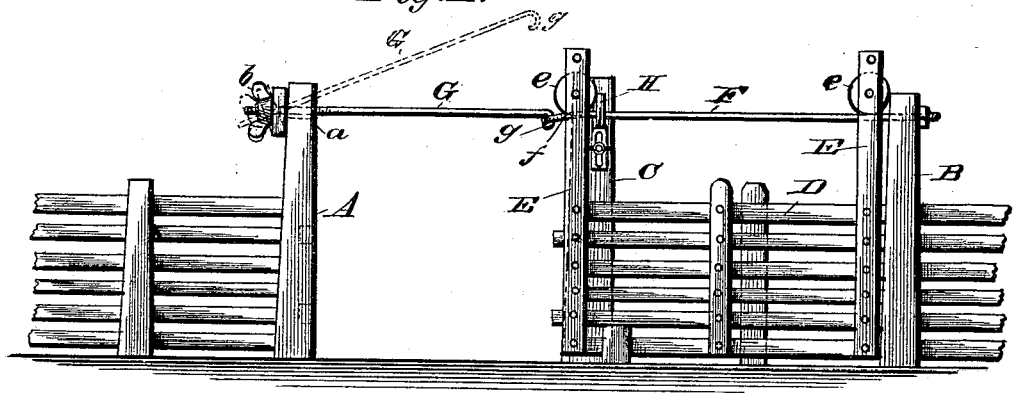
Figure 2:
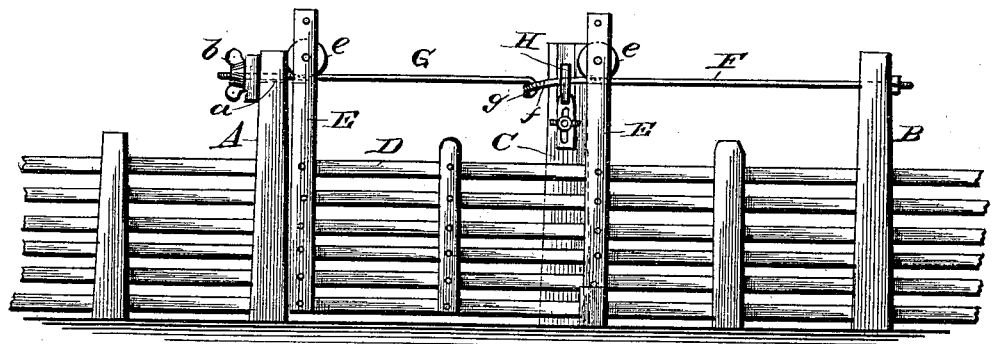
Figure 3:
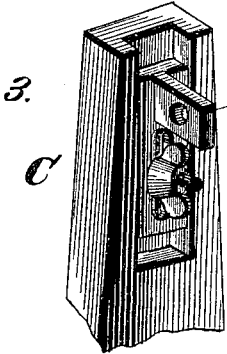
Figure 4:
Figure 5:
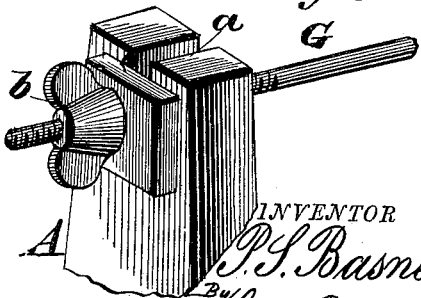

Figure 1 is a side elevation of my improved gate, showing one of the guide-bars in its raised or elevated position and the gate open. Fig. 2 is a similar view showing the gate closed. Fig. 3 is a detail view of the bracket which supports the jointed ends of the two connected guide rods or bars. Fig. 4 is a detail view of the jointed ends of the said rods or bars, and Fig. 5 is a detail view of one of the end posts, showing the device for tightening the bars and taking up slack.

Similar letters of reference indicate corresponding parts in all the figures.

My invention has relation to sliding gates of that class in which the gate is provided with sheaves or pulleys which run upon a guide-rod suspended above the gate proper, so that the gate may be pushed to one side when it is desired to open or close it; but in gates of this class as heretofore constructed it will be found that the bars or rods upon which the gate runs are often in the way when it is desired to pass a wagon-load of hay or some other large load through the gate; and the object of my improvement is to construct the gate so as to overcome this difficulty, and construct a gate which shall possess all the advantages of the ordinary sliding gate, so that it may be worked with little exertion of power without having any of the usual drawbacks.

In the accompanying drawings, A and B denote the end posts which support the rod or bar on which the gate runs. Placed about midway between these posts is a third post, C, which forms a central brace or support for the guide-bars.

The gate proper, which is shown at D, has uprights E E, at the upper ends of which are sheaves or pulleys e, which run upon the guide-bars and support the gate, so that it will slide free of the ground.

The usual guide rod or bar is made in two parts or sections, F and G, the section F having an oblong eye, f, which is adapted to receive a hook, g, at the inner end of the other bar, so that when the two sections F and G are connected by hooking the hook g into the eye f, they form one continuous bar or rod extending between the end posts, A and B. The inner end of bar F is inserted through and rests in a bracket or casting, H, fastened upon and projecting from the upper part of the middle post, C, and the opposite end of said bar is fastened in post B by a nut. Bar G rests in a recess, a, in the top of post A, and has a thumb-nut, b, at its outer end, so that after the two bars F and G have hooked together to form one continuous bar in the manner described all slack may be taken up simply by turning thumb-nut b.

From the foregoing description, taken in connection with the drawings, the operation of this gate will be readily understood. On ordinary occasions the gate is worked in the usual manner, simply by sliding it to one side, and the person or wagon passes under bar G. If, however, a load of hay is to enter the gate, or any other wagon-load of unusual proportions is to pass through, then after the gate has been opened to its full width, which will clear the hook g of the sheave at that end of the gate, the bar G is simply unhooked and lifted up, as indicated in dotted lines in Fig. 1; or it may be removed altogether by lifting it out of the notch or recess a, in which one of its ends rests, so that the load will readily pass through, after which the bar is replaced in its former position, and the gate is slid back to close it.

Having thus described my invention, I claim and desire to secure by Letters Patent of the United States—

1. In a sliding gate, a guide-rod or guide-bar for supporting the gate made in two parts or sections hooked together at their inner ends, and means for supporting said ends at any desired height, so arranged that one of said sections may be lifted or removed when the gate is open, so as to be out of the way of a load passing through the gate, the outer ends of said rods being screw-threaded, and a nut fitting on each of said screw-threaded ends, substantially as and for the purpose shown and set forth.

2. In a sliding gate, a guide-rod for supporting the gate, consisting of two pieces provided with hooks at their inner ends and with tightening nuts at their outer ends, and a slotted bracket secured to the middle post the arm of which is perforated, and a bolt and nut for securing the same to said post, substantially as and for the purpose set forth.

In testimony that I claim the foregoing as my own I have hereunto affixed my signature in presence of two witnesses.

PHILIP SHIVELY BASNETT.

Witnesses:
D. L. BOGGESS,
G. L. CUNNINGHAM.